(12) United States Patent
Casalini

(10) Patent No.: US 7,846,360 B2
(45) Date of Patent: Dec. 7, 2010

(54) PROCESS FOR THE PRODUCTION OF GRANULES OF EXPANDABLE THERMOPLASTIC POLYMERS

(75) Inventor: Alessandro Casalini, Mantova (IT)

(73) Assignee: Polimeri Europa S.p.A., Brindisi (IT)

( * ) Notice: Subject to any disclaimer, the term of this patent is extended or adjusted under 35 U.S.C. 154(b) by 1656 days.

(21) Appl. No.: 10/499,323

(22) PCT Filed: Dec. 5, 2002

(86) PCT No.: PCT/EP02/13788

§ 371 (c)(1),
(2), (4) Date: Jan. 26, 2005

(87) PCT Pub. No.: WO03/053651

PCT Pub. Date: Jul. 3, 2003

(65) Prior Publication Data

US 2005/0140039 A1    Jun. 30, 2005

(30) Foreign Application Priority Data

Dec. 20, 2001    (IT)    ................ MI2001A2706

(51) Int. Cl.
*B29C 47/00* (2006.01)
*B29C 71/00* (2006.01)
*B29B 9/06* (2006.01)

(52) U.S. Cl. ............... 264/142; 264/143; 264/211.23; 264/211.13; 264/346

(58) Field of Classification Search .............. None
See application file for complete search history.

(56) References Cited

U.S. PATENT DOCUMENTS

| | | | | |
|---|---|---|---|---|
| 3,341,892 | A | * | 9/1967 | Mayner ................ 425/90 |
| 4,606,873 | A | | 8/1986 | Biglione et al. |
| 4,678,423 | A | | 7/1987 | Bertolotti |
| 5,573,790 | A | | 11/1996 | Wehtje et al. |
| 6,315,931 | B1 | * | 11/2001 | Bruning et al. ........ 264/53 |
| 7,320,585 | B2 | | 1/2008 | Casalini |

FOREIGN PATENT DOCUMENTS

EP    305 862    3/1989

* cited by examiner

*Primary Examiner*—Edmund H. Lee
(74) *Attorney, Agent, or Firm*—Oblon, Spivak, McClelland, Maier & Neustadt, L.L.P.

(57) ABSTRACT

Process for the production of granules of expandable thermoplastic polymers by means of extrusion, which comprises: i) melting the polymer in a single- or multi-screw extruder (2); ii) incorporating an expanding agent in the polymer in the molten state; iii) granulating the polymer thus obtained in a device comprising a die (111), containing a series of ducts (115) made of a material having a high thermal conductivity (114), a cutting chamber (118) containing a set of hydraulic nozzles and a cutting system equipped with a set of knives (215) with a cutting edge which is radial with respect to the surface of the die; iv) annealing the granules thus obtained; v) cooling the annealed granules to room temperature.

9 Claims, 4 Drawing Sheets

PROCESS FOR THE PRODUCTION OF GRANULES OF EXPANDABLE THERMOPLASTIC POLYMERS

Figure 1:
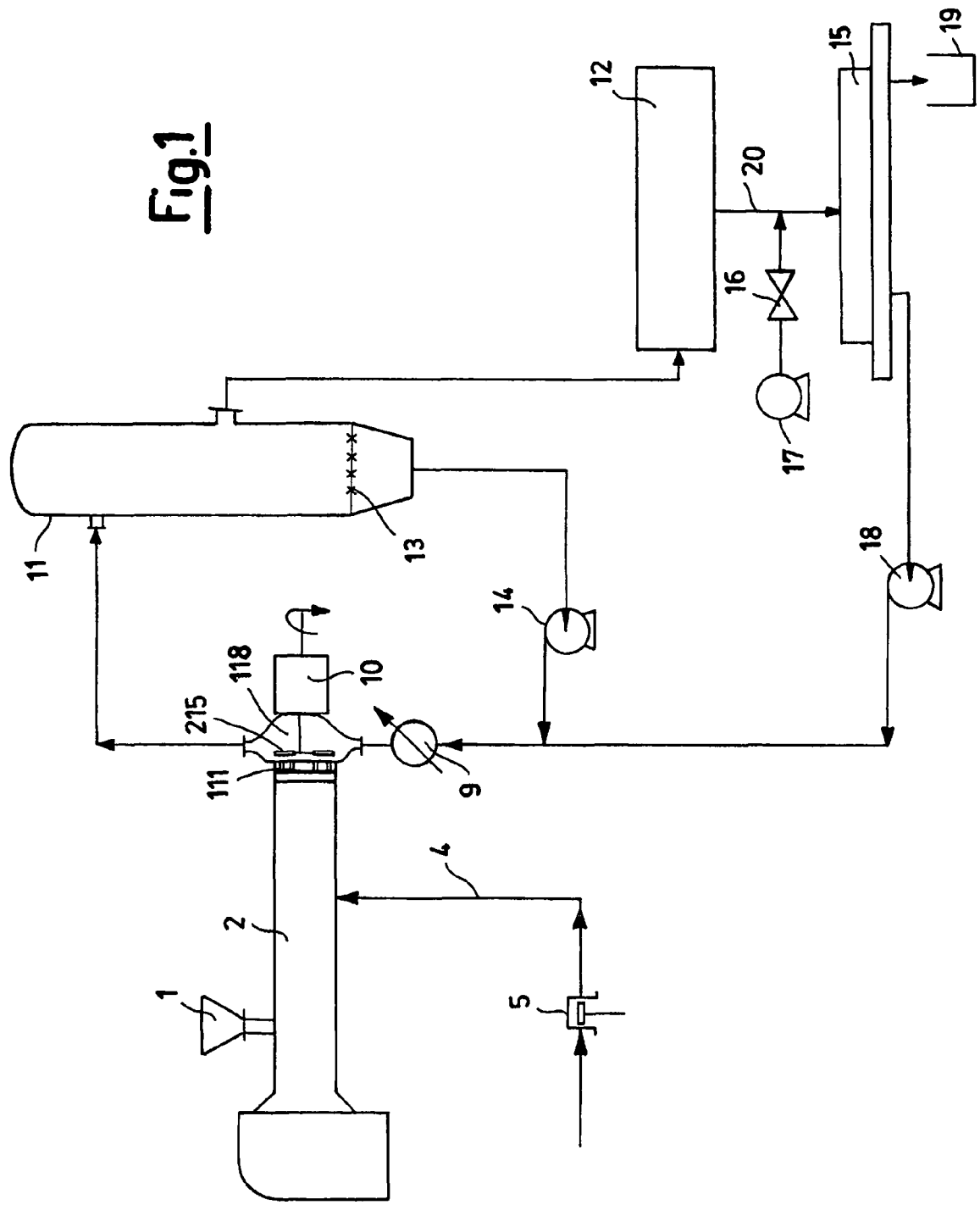

The present invention relates to a process for the production of granules of expandable thermoplastic polymers and the equipment suitable for the purpose.

More specifically, the present invention relates to a process for the production of granules of expandable vinylaromatic polymers, by means of extrustion, and the equipment suitable for the purpose.

Even more specifically, the present invention relates to a process for the production, by means of extrusion, of granules of expandable polystyrene, and the relative equipment. The granules of expandable polystyrene thus obtained are of an excellent quality as they are neither oriented nor stressed and are therefore particularly suitable for the preparation of expanded end-products with a homogeneous internal cellular structure.

It is known that thermoplastic polymers such as polystyrene can be expanded by incorporating an expanding agent in the polymer and subsequently heating the polymer to such temperatures as to allow the expanding agent to vaporize and form the cellular structure.

For polystyrene, the known expanding agents consist of a liquid hydrocarbon containing from 4 to 6 carbon atoms, a halogenated hydrocarbon (Freon), carbon dioxide or water. The quantity of expanding agent generally ranges from 2 to 10% by weight.

Expandable polymers are usually produced in the form of beads or granules which, due to the action of heat, for example supplied by water vapour, are first pre-expanded to a desired density and, after aging, are sintered in closed moulds to obtain blocks or finished articles.

Expandable beads can be obtained by means of a batch polymerization process in aqueous suspension. This process supplies a good-quality product but with the following disadvantages:

extremely dispersed particle-size, with the necessity of separating the single fractions by screening and discarding the tail-ends;

significant limitations in the production of special products such as coloured articles and/or products containing fillers or heterogeneous additives such as nucleating agents, as these additives may be difficult to incorporate or they may inhibit the polymerization;

further limitations in the use of the expanding agent, which must be dispersible and/or soluble in the polymeric matrix or in the use of monomers which must be capable of polymerizing in an aqueous suspension;

difficulty in reducing the residual styrene monomer to below 1000 ppm;

environmental problems due to the considerable consumption of water which cannot be easily discharged and also due to the impossibility of recycling the expanded polymer after use.

Expandable granules can also be prepared in continuous by the addition of the expanding agent in the plasticized polymer in an extruder, with the subsequent hot cutting of the polymer through the holes of a die, as described in GB-A-1,062,307 and GB-A-1,234,639.

This technology also has disadvantages of which the main ones are listed below:

the cut granule is strongly oriented making it difficult to prepare an expanded article by the complete elimination of the stress;

if the granule is not cooled correctly, it can undergo micro-expansions which can influence the quality of the end-product;

the cutting system provides irregular granules in that the flow-rate of the extruder may vary as a result of small variations in the functioning of the apparatus, in the density of the polymer or flow-rate of the expanding agent;

the feeding channels in the die do not guarantee a uniform temperature in the polymer causing instability in extrusion, as the polymer in contact with the metal is at a higher temperature than that of the polymer inside and consequently has a greater fluidity.

The object of the present invention is to provide a process for the production of thermoplastic polymers, optionally expandable, which overcomes the drawbacks mentioned above, and which therefore supplies granules having very limited dimensions and of an excellent quality and homogeneity. More specifically, these granules are neither oriented nor stressed and the cellular structure of the relative expanded products is homogeneous.

The Applicant has now found that it is possible to achieve the above objectives with a process for the production of granules of expandable thermoplastic polymers by means of extrusion, which comprises:

i) bringing the thermoplastic polymer to a temperature higher than the melting point, in a single- or multi-screw extruder;

ii) incorporating at least one expanding agent in the polymer in the molten state;

iii) granulating the polymer thus obtained in a device for the hot granulation of thermoplastic polymers comprising:

a die, positioned at the head of the extruder, consisting of a cylindrical body containing on the outer surface a series of small plates, equipped with a series of extrusion holes, and a plurality of feeding ducts of the molten polymer, situated inside the cylindrical body in correspondence with and connected to the perforated small plates, lined with a material having a high thermal conductivity;

a cutting chamber comprising a set of spraying nozzles which create a jet of drops of a thermostat-regulating liquid, used for cooling and removing the cut granules, nebulized and sprayed against the die; a cutting system comprising a cutting plate, firmly constrained to a rotating shaft, supporting a set of knives arranged so that the cutting profile of the knife is radial with respect to the surface of the die which faces said cutting system;

iv) annealing the granules thus obtained by heating to a temperature higher than or equal to the glass transition temperature (Tg);

v) cooling the annealed granules to room temperature.

According to the present invention, the polymer is fed to an extruder, for example a single- or twin-screw extruder, equipped with a feeding hopper and injection point of the expanding agent, and brought to the molten state after heating to a temperature at least 50° C. higher than the glass transition temperature (Tg) or softening point of the polymeric composition containing the expanding agent, for example from 100 to 200° C. The polymer can at least partly consist, for example up to 30% by weight, of recycled product or waste from previous processings.

Any thermoplastic polymer can be used in the process, object of the present invention. Typical examples are polyolefins, condensation (co)polymers such as polycarbonates and polyesters, (meth)acrylic polymers, engineering polymers, thermoplastic rubbers and polymers deriving from vinylaromatic monomers.

The term "vinylaromatic monomer", as used in the present description and claims, essentially refers to a product which corresponds to the following general formula:

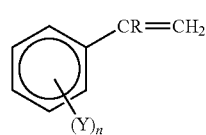

(I)

wherein R is a hydrogen or methyl group, n is zero or an integer ranging from 1 to 5 and Y is a halogen, such as chlorine or bromine, or an alkyl or alkoxyl radical having from 1 to 4 carbon atoms.

Examples of vinylaromatic monomers having the above general formula are: styrene, α-methylstyrene, methylstyrene, ethylstyrene, butylstyrene, dimethylstyrene, mono-, di-, tri-, tetra- and penta-chlorostyrene, bromo-styrene, methoxy-styrene, acetoxy-styrene, etc. Preferred vinylaromatic monomers are styrene and α-methylstyrene.

The vinylaromatic monomers having general formula (I) can be used alone or in a mixture of up to 50% by weight with other copolymerizable monomers. Examples of these monomers are (meth)acrylic acid, $C_1$-$C_4$ alkyl esters of (meth) acrylic acid, such as methyl acrylate, methylmethacrylate, ethyl acrylate, ethylmethacrylate, isopropyl acrylate, butyl acrylate, amides and nitriles of (meth)acrylic acid such as acrylamide, methacrylamide, acrylonitrile, methacrylonitrile, butadiene, ethylene, divinylbenzene, maleic anhydride, etc. Preferred copolymerizable monomers are acrylonitrile and methylmethacrylate.

Typical examples of thermoplastic polymers which can be granulated with the present device are polystyrene (PS), high impact polystyrene (HIPS), polyethylene (PE), polypropylene, the relative PS/PE (or HIPS/PE) alloys, SAN, ABS, polymethylmethacrylate, polyethers such as polyphenyleneether (PPO), polycarbonate from Bisphenol-A, the relative alloys, styrene-butadiene copolymers and, in general, thermoplastic rubbers containing styrene.

An expanding agent, selected from $C_3$-$C_6$ aliphatic hydrocarbons, freon, carbon dioxide, water or a combination of these expanding agents is added to the above polymers, in a quantity ranging from 1 to 10% by weight. These agents can be incorporated into the polymer directly in the extruder or also in a static mixer.

In particular cases, for example when the expanding agent is $CO_2$, in order to facilitate its retention, the polymers can incorporate additives capable of forming bonds, both weak (for example hydrogen bridges) and strong (for example by means of acid-base adducts) with the expanding agent. Examples of these additives are methyl alcohol, isopropyl alcohol, dioctylphthalate and dimethylcarbonate.

The basic polymer may also contain further additives commonly used in traditional granulation processes such as dyes, stabilizers, nucleating agents, shock-resistance agents, inert mineral reinforcing fillers, such as short fibres, mica, talc, silica, alumina, etc. or fillers of athermal materials such as graphite, carbon black, titanium dioxide.

In the granulation phase, the cutting chamber is preferably under pressure to eliminate any risks of pre-expansion of the granules. Pressures ranging from 0.11 to 10 MPa are generally adopted. This pressure is then also maintained in the subsequent annealing step.

At the end of the granulation, the polymer is annealed in a tubular reactor. In particular, the granules which are collected on the bottom of the cutting chamber, together with the thermostat-regulating fluid, are discharged, further water or another thermostat-regulating liquid is added, and they are then sent to the annealing section which comprises at least one tubular reactor. A temperature equal to or higher than the Tg is maintained inside the tubular reactor and the granules remain at this temperature for at least 30 minutes, generally for a time ranging from 30 to 600 minutes.

At the end of the annealing period, the granules are brought to atmospheric pressure, while slowly cooled to room temperature, filtered, dried, screened and finally stored.

A further objective of the present invention relates to the granulation device described in paragraph (iii) above, together with the extruder and annealing reactor.

In the granulation device, the die is capable of ensuring high flow-rates of polymer in the molten state and of conveying a uniform thermal flow to the free edge of the duct to avoid cooling the polymer itself at the centre of the duct. This guarantees a uniform flow-rate of the extruder and consequently a homogeneous granule size.

In order to achieve this result, the body of the die is thermostat-regulated and maintained at a temperature close to or higher than the softening point of the polymer. The thermostat-regulation can be obtained with any means known in this field, for example by means of electrical resistances or by the circulation of a hot fluid in appropriate channels situated in the body of the die.

The feeding ducts of the polymer can, for example, be arranged in parallel directions with each other and with the axis of the die (substantially coinciding with the rotation shaft of the cutting system), and are lined with a metal having a thermal conductivity higher than 40 W/mK, preferably higher than 100 W/mK. Examples of these metals are copper, silver, gold.

The feeding ducts draw the polymer to be granulated through perforated small plates characterized by a number of holes which varies in relation to the flow-rate to be obtained. This number can be greater than or equal to 1, for example from 4 to 10. The diameter of the holes depends on the type and diameter of the granule to be prepared and is greater than 0.2 mm, typically ranging from 0.2 to 5 mm, preferably from 0.3 to 1.5 mm, even more preferably from 0.4 to 1 mm.

According to an alternative embodiment of the present invention, the small plates can be eliminated and the extrusion holes arranged directly on the die in correspondence with each feeding duct of the molten polymer.

Inside the cutting chamber, the extruded polymer is granulated by the cutting system and cooled by means of a jet of droplets of thermostat-regulating liquid, nebulized and sprayed against the die, thereby forming a mist. This liquid generally consists of water or glycerin, ethylene glycol, mineral oil, silicon oil, etc. or mixtures thereof, and is maintained at a temperature ranging from 10° C. to the softening point of the polymer.

The granulation phase of the expandable polymer can be further facilitated by the use of antisticking additives to be dosed in the thermostat-regulating liquid either in continuous or batchwise, before the formation of the jet of droplets. These additives facilitate the detachment of the beads from the knives as they form a very thin layer on the metal by preventing the gradual fouling of the blades and therefore ensuring a perfect cut also for prolonged runs.

Preferred antisticking agents according to the present invention are polysiloxanes such as polydimethylsiloxanes soluble or emulsifiable in water. The quantity of polysiloxane to be added to the thermostat-regulating liquid before nebulization is higher than 1 ppm, preferably from 1 to 1000 ppm, even more preferably from 10 to 100 ppm.

The thermostat-regulating liquid is sprayed against the die by means of spraying nozzles arranged, for example, in an orthogonal and/or tangential position to the die or fixed to the knives. The spraying nozzles are preferably arranged behind the blade-holder disk so that the surface projected by the knives regulates the flow of droplets on the die by the geometry of the knives themselves and/or the rotation rate of the blade-holder disk and/or of the sprayed drops.

The thermostat-regulating liquid is collected on the bottom of the cutting chamber, together with the cut granules which are discharged and sent to the subsequent annealing treatment.

The cutting system essentially consists of a plate on which two or more knives are constrained. The number and dimensions of the knives can vary in relation to the number and diameter of the ducts of the die or the type of polymer to be granulated, i.e. whether it is a high or low viscosity polymer. Generally, a number of knives greater than or equal to 1, preferably ranging from 2 to 40, is used.

The knives are generally step-shaped as this guarantees a uniform wear and the knives can be bent without breaking considerably facilitating the multiple start-up operations. Furthermore, step-shaped knives, arranged radially, not only have the purpose of effectively cutting the polymer but also of partializing the flow of thermostat-regulating liquid, nebulized against the die, making it intermittent and uniform.

The knives operate at a constant pressure due to the thrust against the die maintained by a specific positioning system such as that described, for example, in European patent application 266,673. The positioning system allows an optimum pressure to be exerted, which is sufficiently high to guarantee a homogeneous cutting of the granules, thus avoiding the formation of agglomerates, but not excessive in order to limit the wear of the knives and die.

This ensures the qualitative constancy of the granules with respect to dimensions and temperature (a constant pressure makes the thermal exchange of the molten polymer with the surrounding environment much more uniform and constant). It is known in fact that the pressure of the polymer in the die changes in relation to the heterogeneity of the product in the feeding with respect to both the molecular weight and the dispersion of additives such as antioxidants, waxes, dyes, inert fillers, expanding agents, etc.

Figure 2:
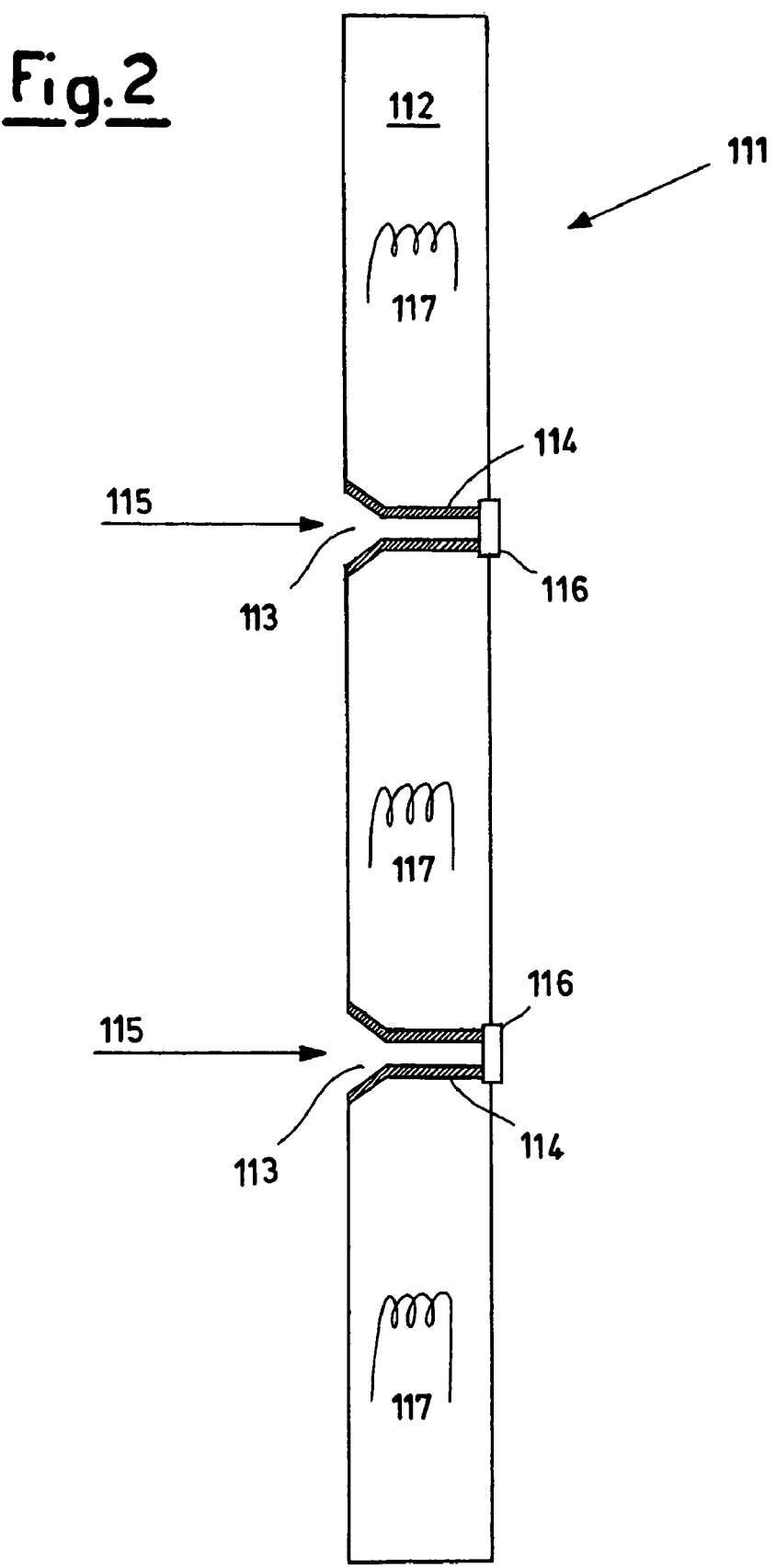
Figure 3:
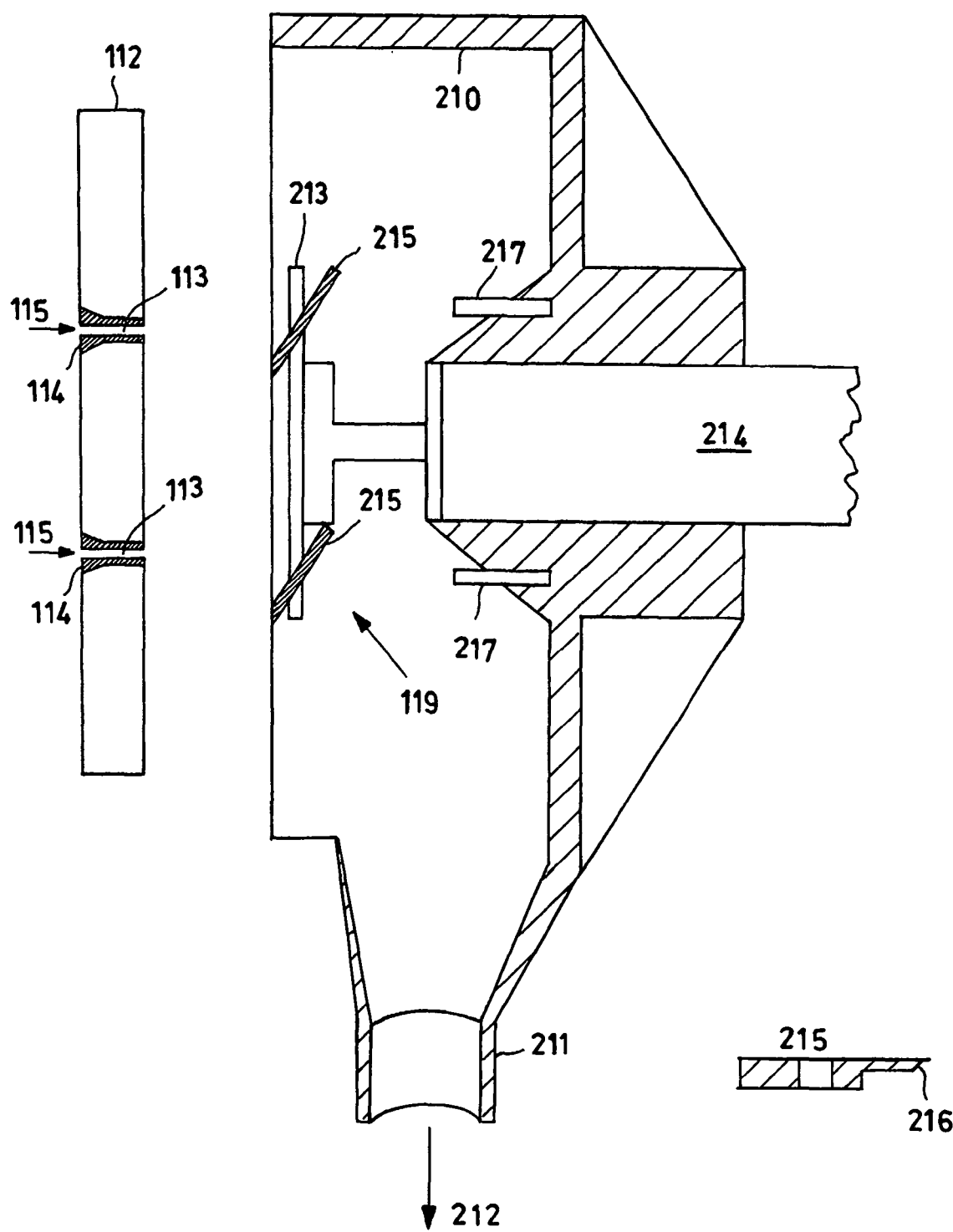
Figure 4:
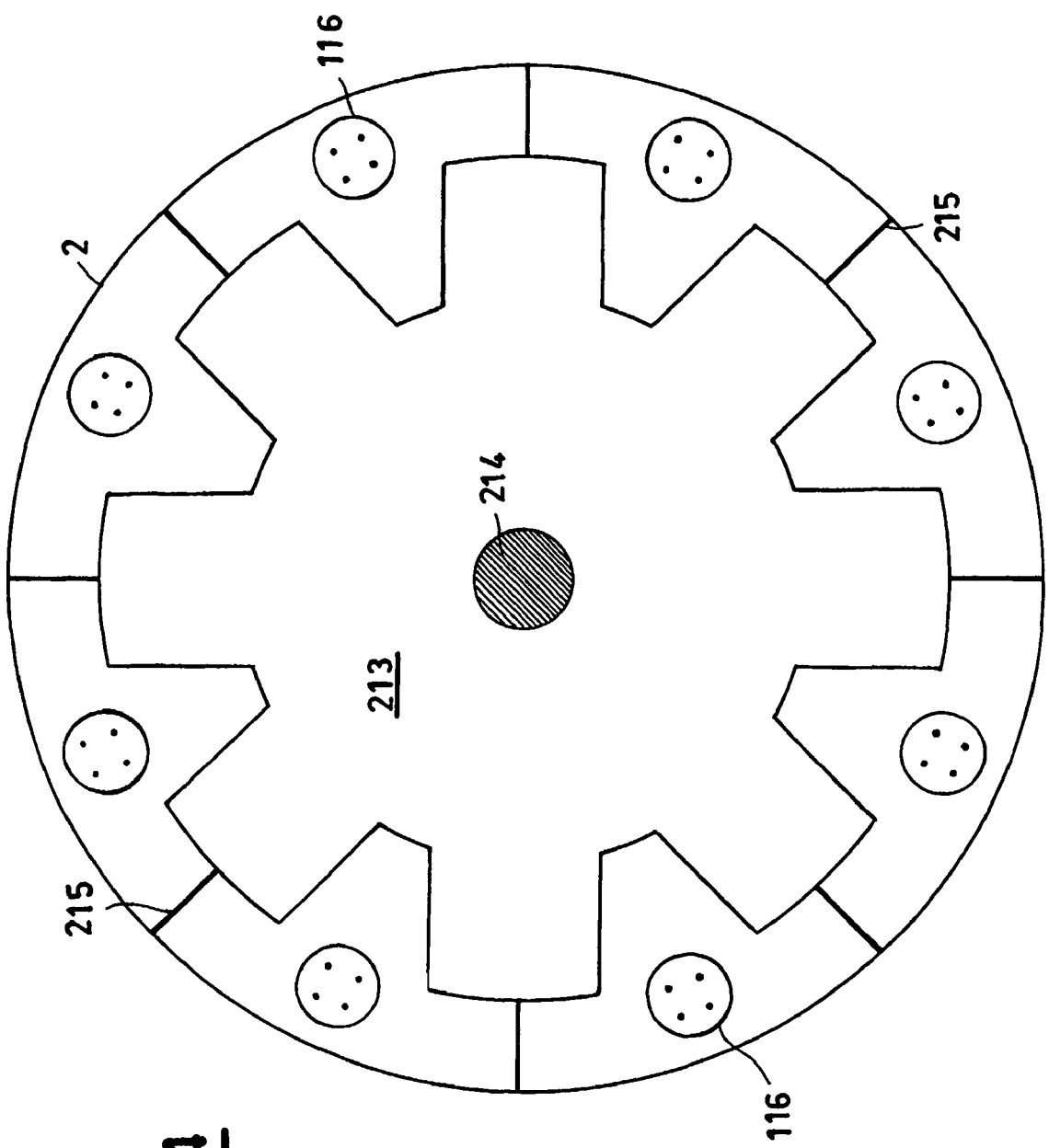

The process and device for the production of granules of expandable thermoplastic polymers, object of the present invention, can be better understood by referring to the drawings of the enclosed figures which represent an illustrative but non-limiting embodiment thereof, wherein:

FIG. 1 represents a block scheme of the granulation cycle of a polymer such as polystyrene; whereas the other figures represent:

FIG. 2 a flat cross-section of the die;

FIG. 3 a flat cross-section of the cutting chamber;

FIG. 4 a simplified view of a rear section of the blade-holder disk.

With reference to FIG. 1, polystyrene granules are fed, through the hopper (1), to a screw extruder (2) of the known type for the hot plasticizing of polystyrene and conveying of the polymer under pressure to the extrusion head or die (111).

The expanding agent is fed to the extruder (2), through the injection line (4) by means of a pump (5). The last part of the extruder (2) is appropriately shaped for the mixing required for ensuring a perfect distribution of the expanding agent in the polystyrene.

The polymer containing the expanding agent is extruded through the holes of the die (111) and cut by knives (215).

The polymer, cut into granules, enters the cutting chamber (118) which surrounds the die and in which water and antisticking additive are sprayed at a pressure of over 0.2 MPa and a temperature ranging from the Tg to the Tg+20° C. of the polymer.

A heat exchanger (9) maintains the water entering the chamber (118) at the required temperature whereas a specific device (10) maintains a constant pressure of the knives (215) against the die (111).

The granules are transported to the upper part of an accumulation tower (11) by the stream of water and subsequently to the tubular annealing reactor (12). The excess water passes through the filter (13) of the accumulation tower and, by means of a pump (14), reaches the exchanger (9) and is thus recycled to the cutting chamber (118).

The polystyrene is kept at a pressure of over 0.2 MPa both in the accumulation tower and in the tubular reactor (12) and the temperature in the tubular reactor is also maintained at a value equal to or higher than the Tg of the product.

The tubular reactor (12), thermostat-regulated, consists of a pipe having a length of various meters, depending on the diameter of the pipe and the residence time which should be at least 30 minutes.

The granules and water are then cooled by discharging in a stream of water before entering the centrifuge (15). The discharge in a stream of water takes place in a pipe (20), a few meters long, so that the pressure drop during the run lowers the pressure from over 0.2 MPa to 0.1 MPa (atmospheric value).

The flow-rate of the cooling water, sent by the pump (17), is regulated by a valve (16) so as to maintain a constant temperature ranging from 30 to 35° C.

The polymer is then separated from the water and dried by the centrifuge (15). The water is filtered to remove any possible granules and recycled by the pump (18) to the cutting chamber (118). The dried granules are collected in the storage container (19) and sent to the subsequent finishing processes (for example deposition of the coating).

The remaining FIGS. 2-4 illustrate the granulation device in detail. In particular, FIG. 2 shows a flat cross-section of the die (111) substantially consisting of the cylindrical body (112) inside which there are ducts (113), lined with a material having a high thermal conductivity (114), for the feeding of the molten polymer (115). The ducts (113) extend outwards through the perforated small plates (116).

Electrical resistances (117) maintain the cylindrical body of the die under correct temperature.

FIG. 3 shows a flat cross-section of the cutting chamber (118) associated with the corresponding cutting system (119). The cutting chamber substantially comprises a container (210) which matches with the die (111), equipped with an outlet (211) from which the mixture (212) of granules mixed with the thermostat-regulating liquid is recovered. The cutting system comprises a blade-holder disk (213), facing the die (111), firmly fixed to a rotation shaft (214). The knives (215) with the stepped cutting edge (216) arranged radially with respect to the die (111), are constrained to the blade-holder disk. Hydraulic nozzles (217), constrained to the rear of the container (210), are situated behind the blade-holder disk, which, fed by a high pressure pump, not illustrated in the Figure, nebulize the thermostat-regulating liquid and spray it against the die in the form of drops or micro-drops.

FIG. 4 illustrates a simplified view of a rear section of the blade-holder disk (213) on which are arranged, for illustrative purposes only, eight knives (215) with the cutting edge radially positioned.

Some illustrative but non-limiting examples are provided hereunder for a better understanding of the present invention and for its embodiment.

EXAMPLE 1

Reference is made to FIG. 1. A polystyrene having an MFI of 8 g/10' (at 200° C./skg) is fed to the extruder (2) through the hopper (1). A mixture of n-pentane/1-pentane, 70/30 by weight, is added, by means of the pump (5) and line (4), to the molten polymer, in a quantity of about 6% by weight.

The expandable polymer is extruded at about 170° C. through the die (111), equipped with ducts lined with copper and holes having a diameter of 0.5 mm, and cut by knives (215). Spherical granules are obtained, having an average diameter of 1 mm, with a very narrow distribution (98% ranging from 0.9 to 1.1 mm).

The die (111) extends into the cutting chamber in which water is nebulized at 0.3 MPa and at a temperature of 60° C., forming a mist in the chamber itself.

The granules are then collected in the accumulation tower (11), sent to the tubular reactor (12) and annealed therein at 60° C. for 120', with a pressure of 0.3 MPa maintained in the whole equipment. The granules are subsequently conveyed into the pipe (20) having a length of 30 m with water at 20° C. The pressure decreases from 0.3 to 0.1 MPa due to the pressure drop along the pipe.

The end-product is then sent to the centrifuge (15) to eliminate the water and collected in the container (19).

0.2% by weight of a mixture of mono-diglyceryl stearate and 0.1% of zinc stearate are subsequently added to the granules which are then expanded with vapour at 100° C. for 3 contact times of 1, 2, 3 minutes. The densities of the respective samples are indicated in Table 1.

The beads expanded at 15 g/l have a uniform cellular structure, with closed cells and with a diameter of about 60 μm. The expanded beads were then moulded in blocks having dimensions of 1000×1080×600 mm after 24 hours of aging at a vapour pressure of 0.04 MPa to evaluate the aging at a vapour pressure of 0.04 MPa to evaluate the cooling time, shrinkage, fusion, with the results indicated in Table 2, and the thermal conductivity at 23° C. (39 mW/mk at a density of 14 g/l). A part of the expanded beads is expanded a second time to further reduce the density to 7.8 g/l.

EXAMPLE 2 (COMPARATIVE)

The same procedure is used as in Example 1 but with the difference that water is nebulized in the cutting chamber at 0.1 MPa. The granules obtained are partially expanded.

EXAMPLE 3 (COMPARATIVE)

The same procedure is used as in Example 1, passing the granules directly from the cutting chamber to the pipe (20) for cooling. The granules obtained, once expanded at 15 g/l, have a non-uniform cellular structure with an external corona of cells having a diameter of about 60 μm and an internal part with larger cells having a diameter ranging from 60 to 150 μm.

EXAMPLE 4

The same procedure is used as in Example 1, adding 1% by weight of titanium dioxide having a diameter of 0.2 μm, to the polystyrene. The expanded beads have a uniform cellular structure, with a diameter of about 55 μm. The thermal conductivity is 36.7 mW/mk (density of 14 g/l).

EXAMPLE 5

The same procedure is used as in Example 1, feeding however a styrene-acrylonitrile copolymer having a 33% content of acrylonitrile and an MFI of 20 g/10' (220° C./10 kg).

Liquid carbon dioxide is added to the molten polymer by means of a pump (5) and line (4), in a quantity of about 6% by weight. The cutting chamber, unlike Example 1, is maintained at a pressure of 8 MPa.

A pressure of 2 MPa is maintained both in the accumulation tower and tubular reactor.

The expansion of the granules obtained is effected with vapour at 103° C.

EXAMPLE 6

The same procedure is used as in Example 5, adding liquid carbon dioxide by means of a pump (5) and line (4), in a quantity of about 6% by weight, and isopropyl alcohol in a quantity of about 2% by weight. The expansion of the granules obtained is effected with vapour at 103° C.

TABLE 1

|  | Vapourization time (min.) | density (g/l) |
|---|---|---|
| EXAMPLE 1 | 1 | 20.5 |
|  | 2 | 17.2 |
|  | 3 | 15.5 |
| EXAMPLE 4 | 1 | 19.5 |
|  | 2 | 15.6 |
|  | 3 | 14.2 |
| EXAMPLE 5 | 1 | 75 |
|  | 2 | 24 |
|  | 3 | 18 |
| EXAMPLE 6 | 1 | 60 |
|  | 2 | 20 |
|  | 3 | 15 |

TABLE 2

| EXAMPLE 1 | | |
|---|---|---|
| density (g/l) | 16.5 | 7.8 |
| cooling time | 30' | 2'3" |
| Shrinkage (mm) | −7 | −5 |
| fusion (%) | 15 | 20 |
| EXAMPLE 4 | | |
| Density (g/l) | 15 | 8.3 |
| Cooling time | 25' | 2'3" |
| Shrinkage (mm) | −2 | −3 |
| fusion (%) | 85 | 35 |

The invention claimed is:

1. A process for the production of granules of expandable thermoplastic polymers by means of extrusion which comprises:
   i) bringing the polymer to a temperature higher than the melting point, in a single- or multi-screw extruder;
   ii) incorporating at least one expanding agent in the polymer in the molten state;
   iii) granulating the polymer thus obtained in a device for the hot granulation of thermoplastic polymers comprising:

a die, positioned at the head of the extruder, consisting of a cylindrical body containing on the outer surface a series of small plates, equipped with a series of extrusion holes, and a plurality of feeding ducts of the molten polymer, situated inside the cylindrical body in correspondence with and connected to the perforated small plates, lined with a material having a high thermal conductivity;

a cutting chamber comprising a set of spraying nozzles which create a jet of drops of a thermostat-regulating liquid, used for cooling and removing the cut granules, nebulized and sprayed against the die;

a cutting system comprising a cutting plate, firmly constrained to a rotating shaft, supporting a set of knives arranged so that the cutting profile of the knife is radial with respect to the surface of the die which faces said cutting system;

iv) annealing the granules thus obtained by heating to a temperature higher than or equal to the glass transition temperature (Tg);

v) cooling the annealed granules to room temperature.

2. The process according to claim 1, wherein the thermoplastic polymer fed to an extruder is brought to the molten state after heating to a temperature at least 100° C. higher than the glass transition temperature (Tg) or softening point of the polymeric composition containing the expanding agent.

3. The process according to claim 1, wherein the thermoplastic polymer consists of up to 30% by weight, of recycled product or waste products of previous processings.

4. The process according to claim 1, wherein the thermoplastic polymer used is selected from polyolefins, condensation (co)polymers such as polycarbonates and polyesters, (meth)acrylic polymers, engineering polymers, polymers deriving from vinylaromatic monomers and thermoplastic rubbers.

5. The process according to claim 1, wherein an expanding agent selected from $C_3$-$C_6$ aliphatic hydrocarbons, freon, carbon dioxide, water or a combination of these expanding agents is added to the thermoplastic polymers, in a quantity ranging from 1 to 10% by weight.

6. The process according to claim 1, wherein the thermoplastic polymers incorporate additives capable of forming both weak and strong bonds with the expanding agent.

7. The process according to claim 1, wherein the cutting chamber operates at a pressure ranging from 0.11 to 10 MPa.

8. The process according to claim 1, wherein the thermoplastic polymer is annealed in a tubular reactor maintained at the same pressure present in the cutting chamber.

9. The process according to claim 1, wherein the annealing takes place in a tubular reactor maintained at a temperature equal to or higher than the Tg of the thermoplastic polymer and for times of at least 30 minutes.

* * * * *